N. S. AND W. A. SNYDER.
AUTOMOBILE ATTACHMENT FOR TRAILERS.
APPLICATION FILED FEB. 13, 1920.
1,367,166.
Patented Feb. 1, 1921.
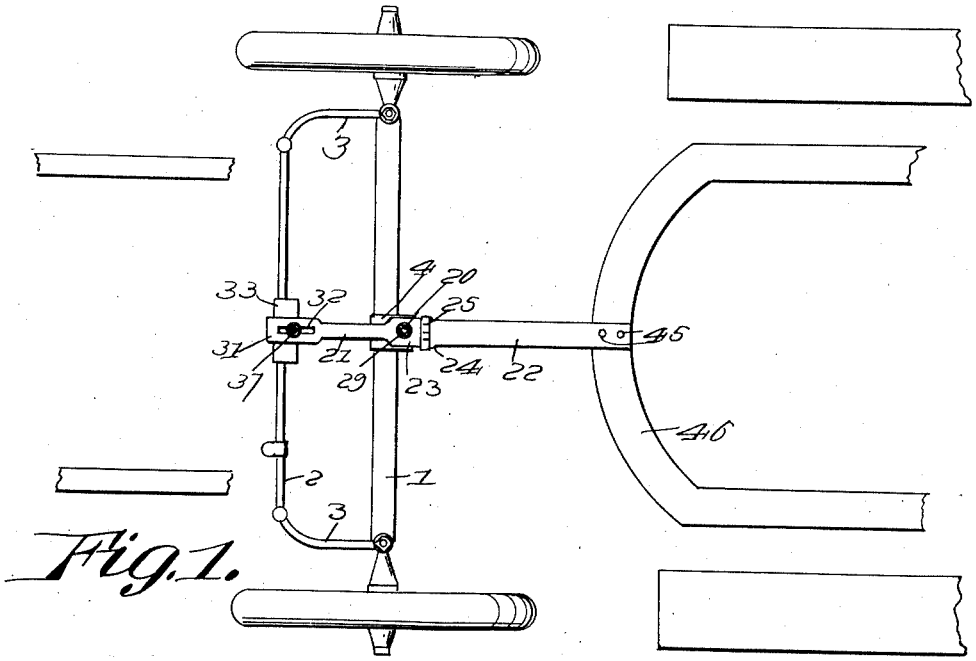
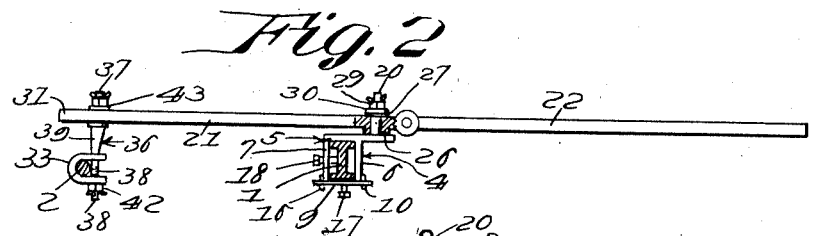
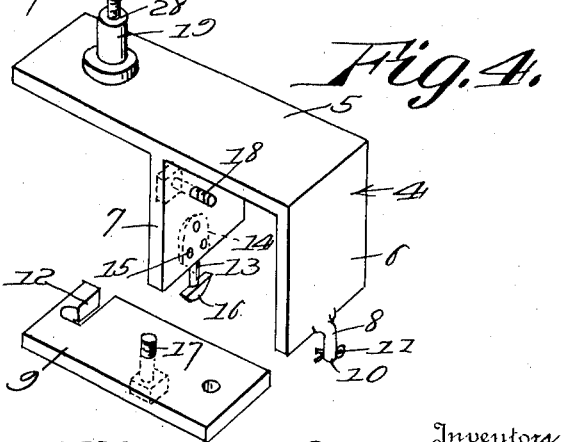
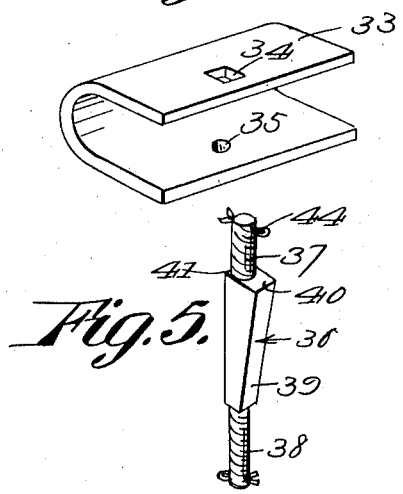
Inventors
Neville S. Snyder and
Walter A. Snyder,
By Watson E. Coleman.
Attorney

UNITED STATES PATENT OFFICE.

NEVILLE S. SNYDER AND WALTER A. SNYDER, OF BAYARD, NEBRASKA.

AUTOMOBILE ATTACHMENT FOR TRAILERS.

1,367,166.   Specification of Letters Patent.   Patented Feb. 1, 1921.

Application filed February 13, 1920. Serial No. 358,411.

*To all whom it may concern:*

Be it known that we, NEVILLE S. SNYDER and WALTER A. SNYDER, citizens of the United States, residing at Bayard, in the county of Morrill and State of Nebraska, have invented certain new and useful Improvements in Automobile Attachments for Trailers, of which the following is a specification, reference being had to the accompanying drawings.

This invention relates to an improved attachment for automobiles, and an object of the invention is to provide a device for connection to the steering mechanism of an automobile and adapted to be connected to the rear of an automobile in advance or to any other motor driven vehicle, such as a tractor for trailing the automobile in the rear.

Another object of the invention is to provide a trailer attachment of this kind, which is very simple, efficient and practical in construction, and capable of being manufactured very cheaply, therefore, it may be sold at a reasonable profit.

A further object is to provide a trailer connection or coupling, which is capable for attachment to any suitable location on the front axle of the automobile, so that while the automobile is capable of trailing in the rear of an automobile in advance, it will travel in an offset position relative to the advanced automobile or other vehicle.

A still further object resides in the provision of improved means for connecting the trailer or coupling to the transverse rod of the steering mechanism, whereby as the advance automobile or other vehicle makes a turn, thereby moving a member of the trailer or coupling, the steering mechanism of the rear automobile will be operated to turn the front wheels of said rear automobile.

An additional object of the invention consists of a novel and practical construction of means for attaching the trailer or coupling to the transverse rod of the steering mechanism of the rear automobile.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a plan view showing the rear and the front of two automobiles or other motor driven vehicles, illustrating the part of the steering mechanism of the rear automobile, and showing the trailer or coupling as applied, so that one automobile can trail in the rear of the other.

Fig. 2 is a longitudinal sectional view through the trailer or coupling, showing its connections to the front axle and the cross rod of the steering mechanism of the rear automobile.

Fig. 3 is an enlarged detail view of the connection of the trailer to the cross rod of the steering mechanism, and Fig. 4 is an enlarged detail view of one of the parts of the connections with the front axle.

Fig. 5 is a detail perspective view of the pin 36.

Referring more especially to these drawings, 1 designates the front axle of an automobile adapted to trail in the rear of another vehicle or tractor, and 2 denotes the cross connecting rod of the arms 3 of the knuckle hub members of the front wheels of the automobile.

Engaging the front axle is a clamp 4 which comprises a plate 5 and the parallel depending plates 6 and 7. This clamp is designed to straddle the front axle as shown, so that the plates 6 and 7 engage the front and rear of the axle. The plate 6 has integral therewith an angular arm 8. A clamping plate 9 is pivoted upon the depending part 10 of the angular arm so that by means of the cotter pin 11 the clamping plate is held pivotally upon the depending part of the arm. The clamping plate engages the lower edge of the depending piece or flange 7 and is provided with a slot 12 substantially the shape shown, to receive the shank 13 of the plate 14, which is secured in any suitable manner as at 15 to the end piece or plate 7. The head 16 of the shank acts to prevent downward movement of the clamping plate 9, and also constitutes an abutment. The head 16 of the shank 13 is necessary so that the clamping plate 9 may bear against the under face of the head, owing to a set screw or set bolt 17 being threaded through the plate 9 and bearing against the under face of the axle 1. When the set screw or bolt 17 is tightened up the clamping plate 9 will be forced toward the upper face of the head 16 of the shank so as to hold the clamp securely in position on the axle. A second set screw 18 is threaded through the plate 7 of the clamp and bears against the rear face of the axle to additionally secure the clamp in position.

Rising upwardly from one end of the plate 5 is a stud 19 provided with a reduced threaded extension 20. The trailer or coupling attachment proper comprises the elongated plates 21 and 22, provided with adjacent enlarged portions 23 and 24, which are hingedly connected as at 25, whereby the elongated plate 22 may be raised or lowered so as to conveniently attach to any suitable location on the automobile or other vehicle in front. The broad portion 23 of the plate 21 on its lower face has a boss 26, through which and through the plate an opening 27 is formed, for the reception of the stud 19. By means of the boss, the plate 21 is held spaced above the plate 5 of the clamp so that the plate 21 will freely swing. A washer is fitted upon the reduced threaded extension 20 so as to engage the shoulder 28 at the point where the reduced threaded extension joins the stud. A securing nut 29 is threaded upon the reduced threaded extension 20 and has a broad annular flange 30, which bears upon the washer which engages the shoulder 28. By this construction the trailer plate 21 is held swivelly, but securely on the stud.

The rear end of the trailer plate 21 terminates in an enlargement 31 provided with an elongated slot 32. A U-shaped clamp 33 straddles the cross connecting rod 2 of the steering mechanism and one flange of this clamp has a rectangular opening 34 while the other flange is provided with a circular opening 35. A pin 36 is provided, and one end 37 thereof is larger than the opposite end 38, and is offset from axial alinement with the opposite end 38. This offset arrangement of the larger end is the result of constructing one portion of the side of the intermediate part 39 tapered and where this intermediate part 39 extends from the larger end of the pin, shoulders 40 and 41 are formed. One of the shoulders is greater than the other. The end portion 38 of the pin 36 is threaded and where the threaded end portion 38 extends from the mid-length part, the end of the mid-length part is rectangular in cross section so as to wedge in the rectangular opening 34 of one of the flanges of the clamp 33. The end portion 38 of the pin passes through the opening 35 of the other flange of the clamp 33 and is provided with a nut 42 for drawing the pin through the flanges and causing the rectangular part of the mid-length portion of the pin to wedge in the opening 34 and at the same time drawing the two flanges toward each other and causing a tight fit of the clamp on the cross connecting rod 2. The pin 36 when coupling the plate 21 to the cross connecting rod 2 is first inserted through the slot 32 with the slightly tapered or inclined portion of the pin facing the cross connecting rod. The pin is inserted sufficiently until the shoulders are below the plate 21 and then a partial turn is imparted to the pin to dispose the shoulders under the plate, that is to say, on opposite sides of the slot, then the threaded end portion 38 is passed through the two flanges of the clamp 33, until the rectangular part of the mid-length portion of the pin engages the rectangular opening 34 to hold the pin rigid. It will be seen that through the medium of the elongated slot the plate 21 is capable of having a loose sliding connection with the larger end of the pin 36 as well as a pivotal connection, there being a washer 43 on the larger end of the pin, and a cotter pin 44 passing through the larger end of the pin 36, to pivotally connect the plate 21 to the pin 36 and in such a manner as to prevent upward movement of the plate 21.

It will be seen that when the automobile or other vehicle in advance turns in one direction or the other, the plate 21 will oscillate on the stud 19, and through the medium of the connection of the plate 21 with the cross connecting rod, the front wheels of the trailing automobile or vehicle will turn in the proper direction to follow the vehicle which is in advance. The plate 22 is provided with a plurality of openings 45, in either one of which a pin of a truck 46 of the vehicle (which is in advance) may pivotally engage so that the two vehicles may be coupled together.

By this trailer or coupling connection, it is obvious that a train of motor driven vehicles may be coupled together for the purpose of transmitting such carriers from one place to another, the steering of the front automobile acting to steer all the others in the rear. This trailer or coupling device may be well adapted for use in the army, for transmitting trains of motor trucks, it being only necessary to keep the motors of the intermediate trucks in operation, so as to relieve the load on the forward trucks, which may be steered by a single operator. However, this device is found particularly useful by farmers, for trailing the automobile in the rear of a tractor, or other machine, in going from one field to another. In other words, the automobile can be attached to the rear of the tractor and the two brought to the barn together.

The invention having been set forth, what we claim as new and useful is:

1. In a trailer attachment, the combination with towing and trailing motor driven vehicles, of a link attached to the rear of the towing vehicle, a second link operatively connected to the first link whereby the two links may flex in vertical planes, the second link being pivoted on the front axle of the trailing vehicle to move in a horizontal plane, the rear end of the second link having an elongated slot, a U-shaped clamp straddling the cross connecting rod of the steering mechanism of the trailing vehicle, the upper arm of the clamp having a rectangular opening, the lower arm of the clamp having an opening, a pin having a medial wedge portion rectangular in cross section to bind in the rectangular opening of the upper arm of the clamp, said pin terminating in its lower end in a threaded extension engaging through the opening of the lower arm, means engaging the threaded extension to bind the medial wedge portion in the rectangular opening and adapted to draw the two arms of the clamp together and bind the clamp on the cross connecting rod, the upper end of the pin having an extension engaging through the slot of the second link, and means on the upper extension of the pin to hold it loosely in engagement with the slot whereby as the towing vehicle turns, the front wheels of the trailing vehicle correspondingly turn.

2. In a trailer attachment, the combination with towing and trailing vehicles, of a link connected to the rear of the towing vehicle, a second link pivotally connected to the first link whereby the two links may flex in vertical planes, a U-shaped clamp straddling the front axle of the trailing vehicle, one of the arms of the clamp having a projection, the other arm of said clamp having a T-shaped extension, a plate engaging under said axle having a slot at one end and engaged by the T-shaped extension, said slot having an offset part at its bottom to be engaged by the shank of the T-shaped extension, the other end of the plate having an opening to receive said projection, means engaged through the projection to retain the plate in position, said U-shaped clamp having a forward part provided with an upstanding stud on which the second link is pivoted for movements in a horizontal plane, means on the stud for holding the second link in engagement with the stud, and means operatively connecting the rear end of the second link to the cross connecting rod of the steering mechanism of the trailing vehicle, whereby as the towing vehicle turns, the front wheels of the rear vehicle will correspondingly turn.

In testimony whereof we hereunto affix our signatures.

NEVILLE S. SNYDER.
WALTER A. SNYDER.